United States Patent
Choi et al.

(10) Patent No.: US 8,615,078 B2
(45) Date of Patent: Dec. 24, 2013

(54) METHOD AND APPARATUS FOR PROCESSING F-FUNCTION IN SEED ENCRYPTION SYSTEM

(75) Inventors: Doo Ho Choi, Daejeon (KR); You Sung Kang, Daejeon (KR); Ju Han Kim, Daejeon (KR); Kyunghee Oh, Daejeon (KR); Taesung Kim, Daejeon (KR); Yong-Je Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 542 days.

(21) Appl. No.: 12/784,789

(22) Filed: May 21, 2010

(65) Prior Publication Data

US 2011/0044450 A1 Feb. 24, 2011

(30) Foreign Application Priority Data

Aug. 21, 2009 (KR) .................. 10-2009-0077749
Dec. 11, 2009 (KR) .................. 10-2009-0123130

(51) Int. Cl.
*H04L 9/28* (2006.01)

(52) U.S. Cl.
USPC .............................................. 380/28; 380/29

(58) Field of Classification Search
USPC ................................................. 380/28, 29
See application file for complete search history.

(56) References Cited

U.S. PATENT DOCUMENTS

| | | | |
|---|---|---|---|
| 6,128,386 A | 10/2000 | Satterfield | |
| 6,658,569 B1* | 12/2003 | Patarin et al. ................. | 713/194 |
| 6,940,975 B1* | 9/2005 | Kawamura et al. ............. | 380/37 |
| 7,334,133 B2 | 2/2008 | Goubin | |
| 7,386,130 B2* | 6/2008 | Ito et al. ......................... | 380/263 |
| 2005/0259814 A1* | 11/2005 | Gebotys ......................... | 380/28 |
| 2007/0076864 A1* | 4/2007 | Hwang ........................... | 380/29 |
| 2007/0188355 A1 | 8/2007 | Baek | |
| 2008/0259814 A1* | 10/2008 | Lin ................................. | 370/252 |
| 2008/0260145 A1* | 10/2008 | Trichina ........................ | 380/46 |

FOREIGN PATENT DOCUMENTS

| | | |
|---|---|---|
| JP | 2007-334016 A | 12/2007 |
| KR | 1020050060301 A | 6/2005 |
| KR | 10-2006-0086743 A | 8/2006 |
| KR | 100834096 B1 | 5/2008 |

OTHER PUBLICATIONS

H.J. Lee et al. "RFC 4269: The SEED Encryption Algorithm" © 2005 The Internet Society. (16 pages) http://tools.ietf.org/pdf/rfc4269.pdf.*

Article for "SEED" from Wikipedia as originally published on Jan. 8, 2009 (2 pages) http://en.wikipedia.org/w/index.php?title=SEED&oldid=262776084.*

Joon-Ho Hwang. "Efficient Hardware Architecture of SEED S-box for Smart Cards" Journal of Semiconductor Technology and Science, vol. 4, No. 4, Dec. 2004. (pp. 307-311).*

(Continued)

*Primary Examiner* — Darren B Schwartz
*Assistant Examiner* — Thomas Gyorfi

(57) ABSTRACT

An apparatus for processing an F-function in a SEED encryption system includes: an arithmetic operation masking conversion unit for converting a logical operation mask value obtained by performing a logical operation of a SEED F-function input value and a random mask value into an arithmetic operation mask value; and a masking G-function unit for taking the arithmetic operation mask value from the arithmetic operation masking conversion unit as an input and producing an arithmetic operation output.

5 Claims, 2 Drawing Sheets

(56) References Cited

OTHER PUBLICATIONS

Louis Goubin, "A Sound Method for Switching between Boolean and Arithmetic Masking," CHES 2001, LNCS 2162, 2001, pp. 3-15, Springer-Verlag Berlin Heidelberg.

Jean-Sebastien Coron et al., "A New Algorithm for Switching from Arithmetic to Boolean Masking," CHES 2003, LNCS 2779, 2003, pp. 89-97, Springer-Verlag Berlin Heidelberg.

Olaf Neibe et al, "Switching Blindings with a View Towards IDEA," CHES 2004, LNCS 3156, 2004, pp. 230-239, International Association for Cryptologic Research.

* cited by examiner

METHOD AND APPARATUS FOR PROCESSING F-FUNCTION IN SEED ENCRYPTION SYSTEM

CROSS-REFERENCE(S) TO RELATED APPLICATION(S)

The present invention claims priority of Korean Patent Applications No. 10-2009-0077749, filed on Aug. 21, 2009, and No. 10-2009-0123130, filed on Dec. 11, 2009, which are incorporated herein by reference.

FIELD OF THE INVENTION

The present invention relates to a SEED encryption technique which is one of symmetric key encryption techniques; and, more particularly, to an apparatus and method for processing an F-function in a seed encryption system, which are suitable to prevent primary power/electromagnetic wave side-channel analysis attack.

BACKGROUND OF THE INVENTION

Side-channel attack is one of the powerful attack techniques against encryption algorithms. The side-channel attack is gradually becoming a large threat to security products. Among the side-channel attack, power/electromagnetic wave side-channel analysis is an attack method by which secret information (mainly, key information) of encryption algorithm is analyzed by collecting power consumptions or electromagnetic waves generated when driving the encryption algorithm and statistically analyzing them.

In order to avoid such power/electromagnetic wave side-channel analysis attack, various prevention techniques have been suggested. Among them, a masking technique is a typical method of preventing the side-channel analysis attack at an algorithm level. The masking technique makes it difficult to extract secret information through statistical analysis of collected power waveforms or electromagnetic wave data by adding random data to original data to be encrypted or performing a logical operation (e.g., exclusive OR (XOR) operation).

However, in the case of composing a masking F-function, the conventional masking method has a problem that the procedure of converting an arithmetic operation mask value, e.g., a $2^{32}$ modular addition mask value, into a logical operation mask value, e.g., an XOR mask value has to be repeated many times.

SUMMARY OF THE INVENTION

In view of the above, the present invention provides a technology for processing an F-function in a SEED encryption system, which transforms and designs an F-function of a SEED algorithm, i.e., a domestic standard symmetric key algorithm, used for IC cards, electronic commerce, etc. by a masking method so as to be safe from primary power/electromagnetic wave side-channel analysis attack, more specifically, which can design a masking F-function such that the procedure of converting an arithmetic operation mask value, e.g., a $2^{32}$ modular addition mask value, into a logical operation mask value, e.g., an XOR mask value is never required in the masking F-function.

In accordance with a first aspect of the present invention, there is provided an apparatus for processing an F-function in a SEED encryption system, the apparatus including:

an arithmetic operation masking conversion unit for converting a logical operation mask value obtained by performing a logical operation of a SEED F-function input value and a random mask value into an arithmetic operation mask value; and a masking G-function unit for taking the arithmetic operation mask value from the arithmetic operation masking conversion unit as an input and producing an arithmetic operation output.

In accordance with a second aspect of the present invention, there is provided a method for processing an F-function in a SEED encryption system, the method including:

converting a logical operation mask value obtained by performing a logical operation of a SEED F-function input value and a random mask value into an arithmetic operation mask value; and taking the arithmetic operation mask value converted from the logical operation mask value as an input and producing an arithmetic operation output to generate a total masking F-function.

In accordance with a third aspect of the present invention, there is provided a method for processing an F-function in a SEED encryption system, the method including:

selecting a random mask value;

generating a masked S-box table which takes an arithmetic operation masking input as a logical operation masking output;

converting 32-bit arithmetic operation masking into 8-bit arithmetic operation masking;

producing a masking G-function which takes an arithmetic operation input obtained by said generating and converting as an arithmetic operation output; and generating a total masking F-function.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENT

Figure 1:
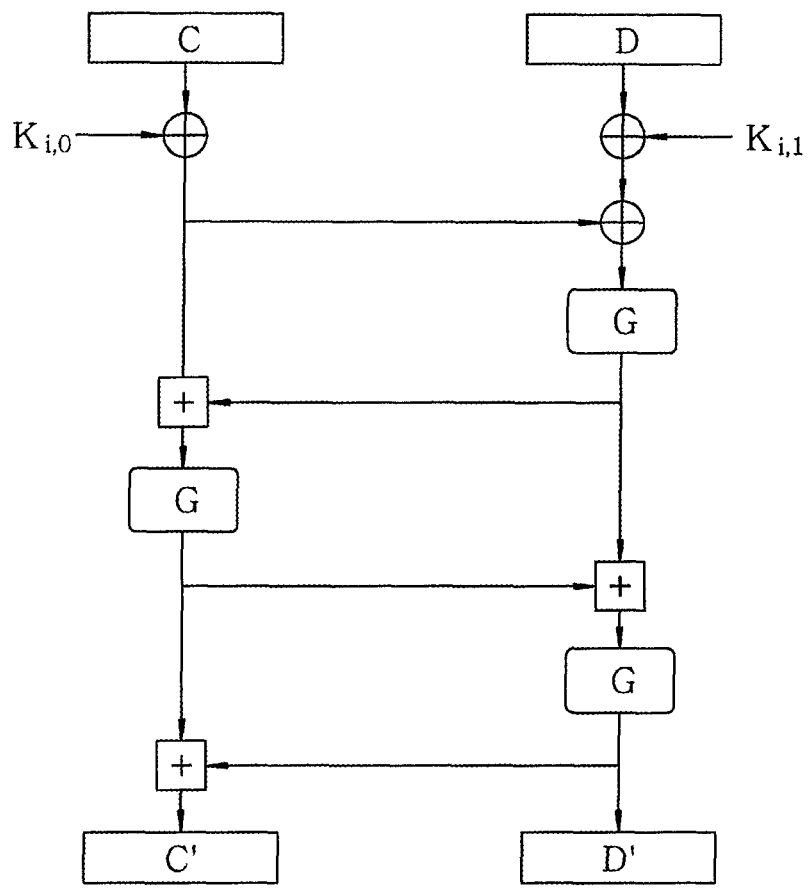
FIG. 1 is a view illustrating a SEED F-function.

FIG. 1 shows a schematic architecture of SEED F-function. As shown in FIG. 1, a SEED F-function is made of a binary operation, a nonlinear S-box operation, and a $2^{32}$ bit modular addition operation (arithmetic operation). To compose a masking F-function, the following three additional algorithms are fundamentally required:

(1) MS-box: A masked S-box table where a logical operation mask input, e.g., an XOR mask input, is taken as an XOR mask output;

(2) B2A: An algorithm for converting a logical operation mask value, e.g., an XOR mask (Boolean mask) value, into an arithmetic operation mask value, e.g., a $2^{32}$ modular addition mask (arithmetic mask) value; and (3) A2B: An algorithm for converting an arithmetic operation mask value, e.g., a $2^{32}$ modular addition mask value, into a logical operation mask value, e.g., an XOR mask value.

In the present invention, by using a new masked S-box table of a $2^8$ modular addition mask input and an XOR mask output, a masking F-function is designed such that only the algorithm B2A for converting XOR masking into $2^{32}$ modular addition masking is used but the algorithm A2B for converting the $2^{32}$ modular addition masking into XOR masking value is not required, thereby improving the efficiency of the masking F-function.

Hereinafter, an embodiment of the present invention will be described in detail with reference to the accompanying drawings.

Figure 2:
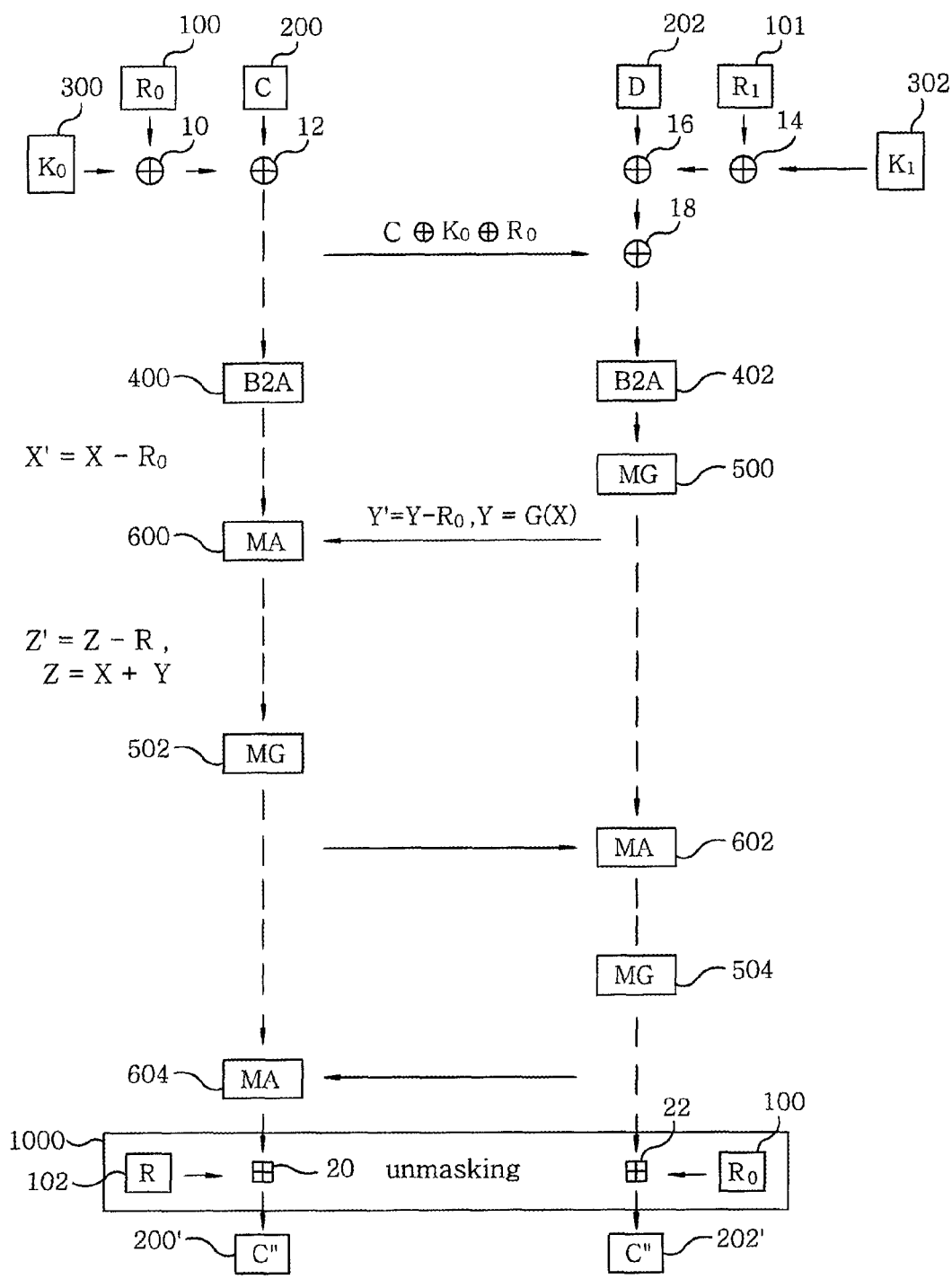
FIG. 2 illustrates a view for explaining a technique for processing an F-function in a SEED encryption system in accordance with an embodiment of the present invention.

FIG. 2 illustrates a design structure of a masking F-function for explaining an apparatus and method for processing an F-function in a SEED encryption system in accordance with an embodiment of the present invention.

Referring to FIG. 2, the apparatus for processing an F-function in a SEED encryption system includes logical operators 10, 12, 14, 16, and 18, arithmetic operators 20 and 22, arithmetic operation masking conversion units (B2A) 400 and 402, masking G-function units (MG) 500, 502 and 504, and arithmetic operation units (MA) 600, 602, and 604.

$R_0$ 100 and $R_1$ 101 shown in FIG. 2 are 32-bit random mask data. The 32-bit random mask data can be composed using 8-bit random data $r_0$, and r as in the following Equation 1:

$$R_0 = r_0|r_0|r_0|r_0; \quad R = r|r|r|r; \quad R_1 = R_0 \oplus R \quad \text{Equation 1,}$$

where "|" represents parallel data connection.

C 200 and D 202 represent SEED F-function input values, and C' 200' and D' 202' represent SEED F-function output values. These values may be composed of 32-bit data. $K_0$ 300 and $K_1$ 302 represent the left and right round keys of a SEED F-function, respectively.

As illustrated in FIG. 2, the logical operators 10, 12, 14, 16, and 18 may be, for example, exclusive OR (XOR) operators, and the arithmetic operators 20 and 22 may be, for example, $2^{32}$ modular addition operators.

The arithmetic operation masking conversion units 400 and 402 are means for converting a logical operation mask value, e.g., an XOR mask (Boolean mask) value, into an arithmetic operation mask value, e.g., a $2^{32}$ modular addition mask (arithmetic mask) value. For example, the arithmetic operation masking conversion unit 400 can convert a logical operation value input by the logical operator 12 into an arithmetic operation mask value.

It is noted that one skilled in the art will easily realize that various existing conversion techniques may be used as the arithmetic operation masking conversion units 400 and 402.

The masking G-function units 500, 502, and 504 generates a masked S-box table where an arithmetic operation mask value, e.g., a $2^8$ modular addition mask value, is taken as an input and a logical operation mask value, e.g., an XOR mask value, is taken as an output. Further, the masking G-function units 500, 502, and 504 produces a masking G-function that takes an arithmetic operation input as an arithmetic operation output through the masked S-box table.

An algorithm for generating the masked S-box table in the masking G-function units 500, 502, and 504 is illustrated in Table 1 below.

TABLE 1

Input: SEED S-box $S_i$, i = 1,2,r,$r_0$
Output: MS table $MS_{i,r,r_0}[j]$, i = 1,2, j = 0, ... ,255
  for j=0 to 255 do
    j' ← j + r mod $2^8$
    $MS_{i,r}\cdot[j] \leftarrow S_i[j'] \oplus r_0$
  end for
  return $MS_{i,r,r_0}[\ ]$ As illustrated in Table 1, the algorithm is characterized in that, unlike the existing masked S-box having an XOR mask input and an XOR mask output, a masked S-box table that takes a $2^8$ modular addition mask value as an input and outputs an XOR mask value can be generated.

The following Table 2 describes the masking G-function (MG), in which the input of the masking G-function is a $2^{32}$ modular addition mask X', R, X'=X−R mod $2^{32}$, and the output of the masking G-function is Z"=Z−$R_0$, Z=G(X) (where G(X) may represent an original output value of SEED G-function).

TABLE 2

Input: X', R = r|r|r|r and $R_0$ = $r_0|r_0|r_0|r_0$ such that X' = X − R
mod $2^{32}$, X = $X_3|X_2|X_1|X_0$
  Output: Z' = Z − $R_0$ mod $2^{32}$, where Z = G(Z)
    X" ← $CT_{32,8}$(X',r)
    $Z_i'$ ← $MS_{1,r,r_0}[X_0"]$&$m_i$, i = 0, 1, 2, 3
    $Z_i'$ ← $Z_i' \oplus (MS_{2,r,r_0}[X_1"]$&$m_{i+1 \mod 4})$, i = 0, 1, 2, 3
    $Z_i'$ ← $Z_i' \oplus (MS_{1,r,r_0}[X_2"]$&$m_{i+2 \mod 4})$, i = 0, 1, 2, 3
    $Z_i'$ ← $Z_i' \oplus (MS_{2,r,r_0}[X_3"]$&$m_{i+3 \mod 4})$, i = 0, 1, 2, 3
    Z' ← $Z_3'|Z_2'|Z_1'|Z_0'$(= Z $\oplus R_0$)
    Z' ← B2A(Z', $R_0$)
  return Z'

In Table 2, $C_{32,8}$(X',r) may represent an algorithm for converting a $2^{32}$ modular addition masked value into a $2^8$ addition masked value for each byte.

The function $C_{32,8}$(X',r) can be composed as shown in Table 3 below.

TABLE 3

Input: X' = $X_3'|X_2'|X_1'|X_0'$, r such that X' = X − R mod $2^{32}$,
X = $X_3|X_2|X_1|X_0$
  Output: X" = $X_3"|X_2"|X_1"|X_0"$ such that $X_i"$ = $X_i$ − r mod $2^8$
    Choose r' at random
    $c_p$ ← r'
    for i = 0 to 3 do
      $X_i"$ ← $X_i' + c_p$
      $X_i'$ ← $X_i' − r$ $$c_n = \begin{cases} 1 + r', & X_i" \geq 2^8 - r \\ r', & \text{oterwise} \end{cases}$$

$c_p \leftarrow c_n$
      $X_i"$ ← $X_i"$ mod $2^8$
    end for
  return X"

In Table 2, the masking G-function performs the same procedure as the SEED G-function on the $2^{32}$ modular addition masked input value using the masked S-box of Table 1, and then outputs an arithmetic operation masked value, i.e., a $2^{32}$ modular addition masked value using the arithmetic operation ($2^{32}$ modular addition) masking conversion units (B2A) 400 and 402. Thus, the masking G-function has a different structure from a general masking G-function having an XOR masked value as an input and output. Also, since the masking G-function does not require an additional conversion technique for the inputting of the arithmetic ($2^{32}$ modular addition) operation unit (MA) 600, i.e., a technique for converting $2^{32}$ modular addition masking into XOR masking, it can improve operational efficiency.

Meanwhile, the arithmetic operation units (MA) 600, 602, and 604 shown in FIG. 2 may be, for example, $2^{32}$ modular addition units, and among them, particularly, the arithmetic operation unit (MA) 600, as illustrated in Table 4, can perform a $2^{32}$ modular addition operation on a masked input.

TABLE 4

Input: $X', Y'$ such that $X' = X - R_0 \mod 2^{32}$, $Y' = Y - R_0 \mod 2^{32}$
Output: $Z' = Z - R \mod 2^{32}$, where $Z = X + Y$
$Z' \leftarrow X' - R \mod 2^{32} (= X - R_0 - R)$
$Z' \leftarrow Z' + R_0 \mod 2^{32} (= X - R)$
$Z' \leftarrow Z' + Y' \mod 2^{32} (= X + Y - R_0 - R)$
$Z_i' \leftarrow Z' + R_0 \mod 2^{32} (= X + Y - R)$
return $Z'$ In the above Table 4, the arithmetic operation unit (MA) 600 may output two inputs $X'=X-R_0 \mod 2^{32}$ and $Y'=Y-R_0 \mod 2^{32}$ obtained by $2^{32}$ modular addition masking as $R_0$, and may output $(X+Y)-R \mod 2^{32}$ obtained by $2^{32}$ modular addition masking as R.

Since the present invention a method of designing a masking F-function for one round only, reference numeral 1000, which depicts a procedure of removing an addition masked value, is included in a design of the masking F-function.

As described above, a design technology of a masking F-function in a SEED encryption system in accordance with the present invention can prevent primary power/electromagnetic wave side-channel analysis attack against a SEED algorithm, as a domestic standard symmetric key algorithm. Further, the masking F-function can be designed such that a procedure of converting an arithmetic operation mask value, e.g., a $2^{32}$ modular addition mask value, into a logical operation mask value, e.g., an XOR mask value is never required in the masking F-function, thereby improving the efficiency of the masking F-function.

While the invention has been shown and described with respect to the embodiments, it will be understood by those skilled in the art that various changes and modification may be made without departing from the scope of the invention as defined in the following claims.

What is claimed is:

1. An apparatus for processing an F-function in a SEED encryption system, the apparatus comprising:
   an arithmetic operation masking conversion unit for converting a logical operation mask value obtained by performing a logical operation of a SEED F-function input value and a random mask value into an arithmetic operation mask value of a $2^{32}$ modular addition mask value; and
   a masking G-function unit for converting the arithmetic operation mask value of the $2^{32}$ modular addition mask value into a $2^8$ modular addition mask value, producing a masked S-box table which takes the $2^8$ modular addition mask value as an input and outputs an XOR mask value, and producing an arithmetic operation output from the XOR mask value.

2. The apparatus of claim 1, wherein the SEED F-function input value is 32-bit data.

3. The apparatus of claim 1, wherein the random mask value is a 32-bit random mask value using 8-bit random data.

4. The apparatus of claim 1, wherein the logical operation mask value is a Boolean mask value.

5. The apparatus of claim 4, wherein the Boolean mask value is an exclusive OR (XOR) mask value.

* * * * *